US011680183B2

(12) United States Patent
Shen et al.

(10) Patent No.: US 11,680,183 B2
(45) Date of Patent: Jun. 20, 2023

(54) AQUEOUS COATING COMPOSITIONS AND METHODS FOR IMPROVING THE FREEZE/THAW STABILITY OF AQUEOUS COATING COMPOSITIONS

(71) Applicant: Dow Global Technologies LLC, Midland, MI (US)

(72) Inventors: Cheng Shen, Shanghai (CN); Jing Ji, Shanghai (CN); Qi Jiang, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 109 days.

(21) Appl. No.: 16/967,447

(22) PCT Filed: Mar. 11, 2019

(86) PCT No.: PCT/US2019/021527
§ 371 (c)(1),
(2) Date: Aug. 5, 2020

(87) PCT Pub. No.: WO2019/177920
PCT Pub. Date: Sep. 19, 2019

(65) Prior Publication Data
US 2021/0214572 A1    Jul. 15, 2021

(51) Int. Cl.
*C09D 133/08* (2006.01)
*C09D 7/65* (2018.01)
*C09D 5/02* (2006.01)

(52) U.S. Cl.
CPC ........... *C09D 133/08* (2013.01); *C09D 5/024* (2013.01); *C09D 7/65* (2018.01)

(58) Field of Classification Search
CPC ......... C09D 133/08; C09D 7/65; C09D 5/024
USPC ....................................................... 524/377
See application file for complete search history.

(56) References Cited

U.S. PATENT DOCUMENTS

| 6,043,301 A * | 3/2000 | Hille ..................... C08G 18/635 523/501 |
| 6,114,458 A | 9/2000 | Hawker et al. |
| 8,993,658 B2 | 3/2015 | Graf et al. |
| 2009/0095202 A1* | 4/2009 | Fechner ............... C09D 17/003 106/31.86 |
| 2009/0186972 A1 | 7/2009 | Zong et al. |
| 2011/0291053 A1* | 12/2011 | Masanaga ............... C04B 28/02 568/679 |
| 2014/0100331 A1 | 4/2014 | Ahrens |
| 2017/0275489 A1* | 9/2017 | Balijepalli ............... C08K 3/32 |
| 2017/0275490 A1* | 9/2017 | Balijepalli ............... C09D 7/61 |

FOREIGN PATENT DOCUMENTS

| CN | 101914201 A | 12/2010 |
| CN | 102702491 A | 10/2012 |
| CN | 103992452 A | 8/2014 |
| CN | 107793813 A | 3/2018 |
| EP | 1275689 A1 | 1/2003 |
| EP | 2703434 A2 | 3/2014 |
| EP | 3225664 A1 | 10/2017 |
| EP | 3225668 A1 | 10/2017 |
| WO | 2011/100660 A1 | 8/2011 |
| WO | 2017/172410 A1 | 10/2017 |
| WO | 2017/172411 A1 | 10/2017 |

OTHER PUBLICATIONS

PCT/CN2018/079211, International Search Report and Written Opinion dated Dec. 19, 2018.
PCT/US2019/021527, International Search Report and Written Opinion dated May 24, 2019.
Office Action from corresponding Japanese application: 2020-547208 dated Nov. 25, 2022.

* cited by examiner

*Primary Examiner* — Kelechi C Egwim

(57) ABSTRACT

Embodiments of the present invention relate to aqueous coating compositions and to methods for improving the freeze/thaw stability of aqueous coating compositions. In one aspect, an aqueous coating composition comprises an aqueous polymeric dispersion and a compound according to Formula (1) as described herein.

7 Claims, No Drawings

AQUEOUS COATING COMPOSITIONS AND METHODS FOR IMPROVING THE FREEZE/THAW STABILITY OF AQUEOUS COATING COMPOSITIONS

FIELD

The present invention relates to aqueous coating compositions and to methods for improving the freeze/thaw stability of aqueous coating compositions.

INTRODUCTION

Manufacturers of paints and coatings are developing new latex binders that do not require the use of volatile solvents and coalescing agents in response to environmental regulations that limit the use of volatile organic compounds (VOC). One of the primary challenges in eliminating solvents from a paint or coating formulation is associated with freeze-thaw stability of the formulation.

Paints and coatings are often subjected to freezing and thawing cycles during storage and shipping due to a lack of temperature control. Under such conditions, the colloidal stability of latex resin particles is compromised, and can result in changes in the consistency of the paint or coating due to drastic changes in formulation viscosity. This can cause the paint or coating to be unusable in many instances.

Solvents such as glycols have been historically used to protect paints and coatings from freeze-thaw stability problems. However, glycol solvents typically have high levels of VOCs.

It would be desirable to have new additives for improving the freeze-thaw stability of paints and other coatings but with reduced levels of VOCs.

SUMMARY

The present invention provides additives for paints and other coatings that can improve the freeze-thaw stability of the paints/coatings. In some embodiments, such additives can provide good coalescence and freeze-thaw protection to the paints/coatings. In some embodiments, such additives have low to near zero-VOC content.

In one aspect, the present invention provides an aqueous coating composition, such as paint, that comprises an aqueous polymeric dispersion and a compound according to Formula 1:

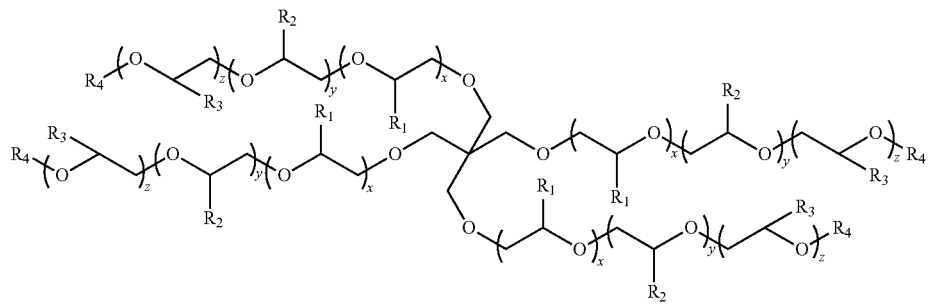

(Formula 1)

wherein $R_1$, $R_2$, and $R_3$ are each independently hydrogen or one of an alkyl group having 1 to 6 carbon atoms, wherein $R_4$ is hydrogen, a linear, branched, or cyclic alkyl group having 1 to 8 carbon atoms, $SO_3M$, or $PO_3M$ wherein M is sodium, potassium, ammonium, or an organic amine, wherein x has an average value from 0 to 10, wherein y has an average value ranging from 0 to 10, wherein z has an average value from 0 to 10, wherein x+y+z is from 3 to 20, and wherein the coating composition comprises 0.1 to 10.0 percent by weight of compounds according to Formula 1 based on the weight of the polymeric dispersion solids.

In another aspect, the present invention provides method for improving the freeze/thaw stability of an aqueous coating composition comprising an aqueous polymeric dispersion, the method comprising adding the compound of Formula 1 to the aqueous coating composition:

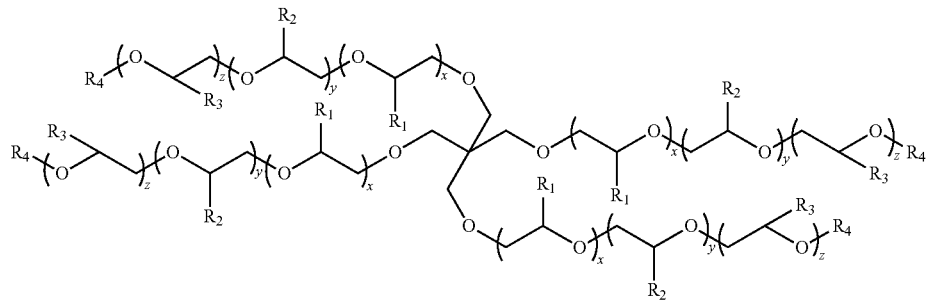

(Formula 1)

wherein $R_1$, $R_2$, and $R_3$ are each independently hydrogen or one of an alkyl group having 1 to 6 carbon atoms, wherein $R_4$ is hydrogen, a linear, branched, or cyclic alkyl group having 1 to 8 carbon atoms, $SO_3M$, or $PO_3M$ wherein M is sodium, potassium, ammonium, or an organic amine, wherein x has an average value from 0 to 10, wherein y has an average value ranging from 0 to 10, wherein z has an average value from 0 to 10, wherein x+y+z is from 3 to 20. 0.1 to 10.0 percent by weight of compounds according to Formula 1 based on the weight of the polymeric dispersion solids are added to the coating composition in some embodiments.

These and other embodiments are described in more detail in the Detailed Description.

DETAILED DESCRIPTION

As used herein, "a," "an," "the," "at least one," and "one or more" are used interchangeably. The terms "comprises," "includes," and variations thereof do not have a limiting meaning where these terms appear in the description and claims. Thus, for example, an aqueous composition that includes particles of "a" hydrophobic polymer can be interpreted to mean that the composition includes particles of "one or more" hydrophobic polymers.

Also herein, the recitations of numerical ranges by endpoints include all numbers subsumed in that range (e.g., 1 to 5 includes 1, 1.5, 2, 2.75, 3, 3.80, 4, 5, etc.). For the purposes of the invention, it is to be understood, consistent with what one of ordinary skill in the art would understand, that a numerical range is intended to include and support all possible subranges that are included in that range. For example, the range from 1 to 100 is intended to convey from 1.01 to 100, from 1 to 99.99, from 1.01 to 99.99, from 40 to 60, from 1 to 55, etc.

Some embodiments of the present invention relate to aqueous coating compositions, such as paints or other coatings. Aqueous coating compositions, in some embodiments, comprise an aqueous polymeric dispersion and the compound of Formula 1:

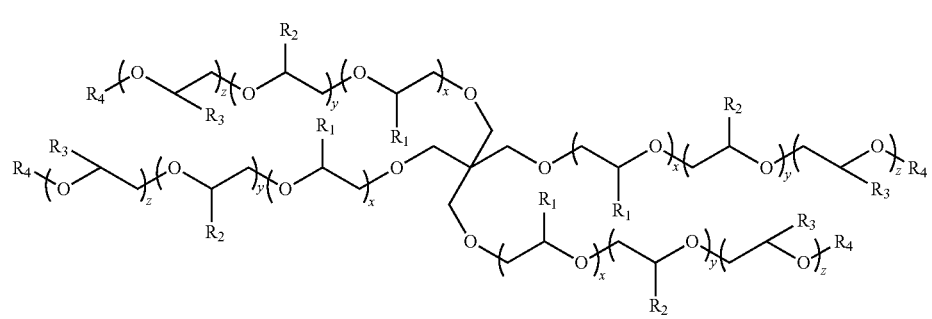

(Formula 1)

wherein $R_1$, $R_2$, and $R_3$ are each independently hydrogen or one of an alkyl group having 1 to 6 carbon atoms, wherein $R_4$ is hydrogen, a linear, branched, or cyclic alkyl group having 1 to 8 carbon atoms, $SO_3M$, or $PO_3M$ wherein M is sodium, potassium, ammonium, or an organic amine, wherein x has an average value from 0 to 10, wherein y has an average value ranging from 0 to 10, wherein z has an average value from 0 to 10, wherein x+y+z is from 3 to 20, and wherein the coating composition comprises 0.1 to 10.0 percent by weight of compounds according to Formula 1 based on the weight of the polymeric dispersion solids. In some embodiments, the coating composition comprises 0.2 to 5.0 percent by weight of compounds according to Formula 1 based on the weight of the polymeric dispersion solids. The coating composition, in some embodiments, comprises 0.4 to 3.0 percent by weight of compounds according to Formula 1 based on the weight of the polymeric dispersion solids. In some embodiments, the compound has a molecular weight from 500 to 6000. The coating composition further comprises a coalescent in some embodiments. In some embodiments, the coating composition further comprises a binder. The aqueous polymeric dispersion, in some embodiments, comprises an acrylic polymer.

Some embodiments of the present invention relate to methods for improving the freeze/thaw stability of an aqueous coating composition comprising an aqueous polymeric dispersion, such as paint or a coating. In some embodiments, the method comprises adding the compound of Formula 1 to the aqueous coating composition:

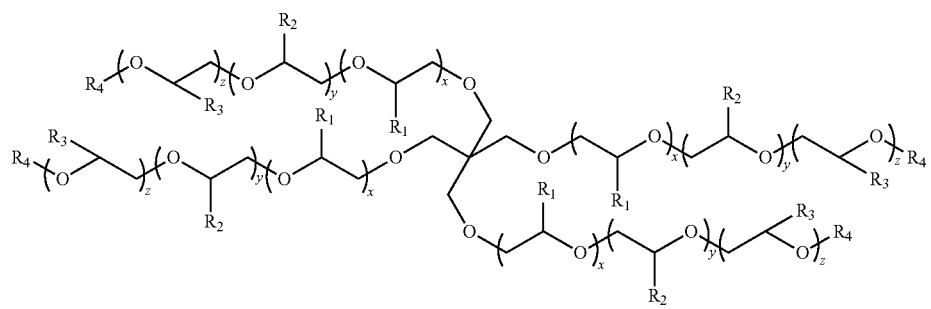

(Formula 1)

wherein $R_1$, $R_2$, and $R_3$ are each independently hydrogen or one of an alkyl group having 1 to 6 carbon atoms, wherein $R_4$ is hydrogen, a linear, branched, or cyclic alkyl group having 1 to 8 carbon atoms, $SO_3M$, or $PO_3M$ wherein M is sodium, potassium, ammonium, or an organic amine, wherein x has an average value from 0 to 10, wherein y has an average value ranging from 0 to 10, wherein z has an average value from 0 to 10, wherein x+y+z is from 3 to 20. 0.1 to 10.0 percent by weight of compounds according to Formula 1 based on the weight of the polymeric dispersion solids are added to the coating composition in some embodiments. In some embodiments, 0.2 to 5.0 percent by weight of compounds according to Formula 1 based on the weight of the polymeric dispersion solids are added to the coating composition. 0.4 to 3.0 percent by weight of compounds according to Formula 1 based on the weight of the polymeric dispersion solids are added to the coating composition in some embodiments. The aqueous polymeric dispersion, in some embodiments, comprises an acrylic polymer. In some embodiments, the coating composition comprises one or more coalescents and/or one or more binders.

Compounds of Formula 1 to be used in various embodiments of the present invention can be prepared as described in the Examples section below. For example, a pentaerythritol-initiated ethoxylate can be further alkoxylated by reacting it with butylene oxide. The reaction product (Compounds of Formula 1) obtained can be purified according to methods known to those skilled in the art, such as by cooling and purging with nitrogen.

The reaction can be carried out in a batch or continuous manner. As noted above, an alkaline catalyst, such as sodium hydroxide or potassium hydroxide, can be used to activate the reaction. It is possible to remove the catalyst from the reaction mixture so that the reaction mixture is substantially free of catalyst, and in one embodiment of the invention, the catalyst is removed from the reaction mixture. In some embodiments, the catalyst is neutralized in the reaction mixture by adding an acid such as phosphoric acid or acetic acid.

Compounds of Formula 1 have the following structure:

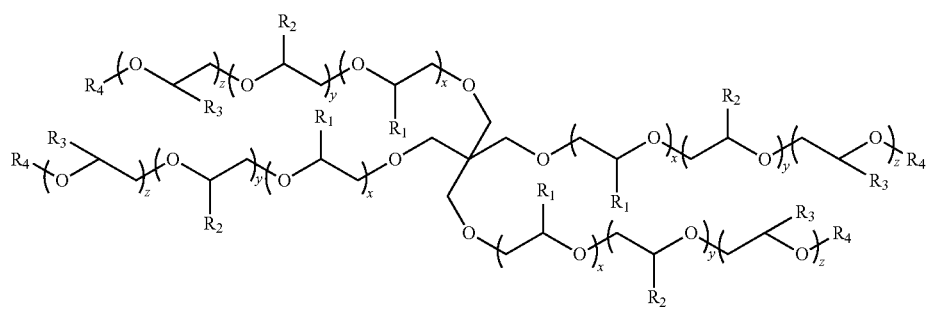

(Formula 1)

wherein $R_1$, $R_2$, and $R_3$ are each independently hydrogen or one of an alkyl group having 1 to 6 carbon atoms, wherein $R_4$ is hydrogen, a linear, branched, or cyclic alkyl group having 1 to 8 carbon atoms, $SO_3M$, or $PO_3M$ wherein M is sodium, potassium, ammonium, or an organic amine, wherein x has an average value from 0 to 10, wherein y has an average value ranging from 0 to 10, wherein z has an average value from 0 to 10, wherein x+y+z is from 3 to 20. In some embodiments of compounds according to Formula 1, the sum of the x values is 5, the sum of the y values is 12, z is 0, $R_1$ is hydrogen, $R_2$ is an ethyl group, and $R_4$ is hydrogen. In some embodiments of compounds according to Formula 1, the sum of the x values is 5, the sum of the y values is 8, z is 0, and $R_1$, $R_2$, and $R_4$ are each hydrogen. In some embodiments of compounds according to Formula 1, the sum of the x values is 5, the sum of the y values is 12, z is 0, and $R_1$ and $R_2$ are each hydrogen, and $R_4$ is $PO_3Na$. Compounds according to Formula 1 used in some embodiments of the present invention have a molecular weight in the range of 500 to 6,000.

In one aspect, compounds of Formula 1 can be added to an aqueous coating composition to improve the freeze/thaw stability of the aqueous coating composition according to methods of the present invention. Paint is one example of such an aqueous coating composition.

In one aspect of the present invention, there is provided an aqueous coating composition comprising an aqueous polymeric dispersion and from 0.1 to 10.0% by weight, based on the weight of polymeric dispersion solids, of the compound of Formula 1 described herein. In some embodiments, the aqueous coating composition comprises from 0.2 to 5.0% by weight, based on the weight of polymeric dispersion solids, of the compound of Formula 1 described herein. The aqueous coating composition, in some embodiments, comprises from 0.4 to 3.0% by weight, based on the weight of polymeric dispersion solids, of the compound of Formula 1 described herein.

The aqueous coating composition can further comprise one or more coalescents in some embodiments. By "coalescent" is meant an ingredient that facilitates the film formation of an aqueous polymeric dispersion, particularly an aqueous coating composition that includes a dispersion of polymer in an aqueous medium such as, for example, a polymer prepared by emulsion polymerization techniques. An indication of facilitation of film formation is that the minimum film forming temperature ("MFFT") of the composition including the aqueous polymeric dispersion is measurably lowered by the addition of the coalescent. In other words, MFFT values are indicative of how efficient a coalescent is for a given aqueous polymeric dispersion; it is desirable to achieve the lowest possible MFFT with the smallest amount of coalescent. MFFTs of the aqueous coating compositions herein are measured using ASTM D 2354 and a 5 mil MFFT bar as described in the Examples section.

In some embodiments, an aqueous coating composition of the present invention comprises from 2 to 12% by weight, based on the weight of aqueous polymeric dispersion solids, of a coalescent. In some embodiments, an aqueous coating composition of the present invention comprises 6 to 8% by weight, based on the weight of aqueous polymeric dispersion solids, of a coalescent.

The coalescent, in some embodiments, comprises at least one of propylene glycol phenyl ether, ethylene glycol phenyl ether, dipropylene glycol n-butyl ether, ethylene glycol n-butyl ether benzoate, tripropylene glycol n-butyl ether, 2,2,4-trimethyl-1,3-pentanediol monoisobutyrate, triethylene glycol bis-2-ethylhexanoate, and/or tributyl citrate. Such coalescents are commercially available from The Dow Chemical Company (e.g., UCAR™ Filmer IBT), Eastman Chemical Company (e.g., Eastman Optifilm Enhancer 400), and others.

As described below, the compound of Formula 1 and one or more coalescents can be provided as part of an aqueous coating composition. However, in some embodiments, a composition comprising the compound of Formula 1 and one or more coalescents can be prepared as a composition, and such compositions can be provided to third parties. Such third parties might be, for example, manufacturers of aqueous coating compositions that can incorporate the composition comprising the Formula 1 compound and the coalescent(s) into their coating compositions. Thus, some embodiments of the present invention relate to compositions comprising the compound of Formula 1 and one or more coalescents.

With regard to aqueous polymeric dispersions that can be included in aqueous coating compositions of the present invention, the aqueous polymeric dispersion may be a dispersion comprising a polymer, oligomer, prepolymer, or a combination thereof in an aqueous medium. In some embodiments, the aqueous polymeric dispersion forms a film upon evaporation of water and is not reactive. By "aqueous medium" is meant herein a medium including at least 50%, by weight based on the weight of the medium, water. The polymer, oligomer, prepolymer, or combination in the aqueous polymeric dispersion is often referred to as a binder. The choice of binder is not particularly critical, and the binder can be selected from all type of binders known in the art including, for example, styrene-acrylic, all acrylic, vinyl acrylic, vinyl acetate acrylic, ethylene vinyl acetate, and vinyl acetate polymeric binders, and hybrids of these and other chemistries. In some embodiments, the binder is a binder that is suitable for use for interior wall paint. In some embodiments, the binder is a binder that is suitable for use in exterior paint.

The average particle diameter of the polymer particles in the dispersion is not particularly critical, and advantageously is from 40 nm to 1000 nm, preferably from 40 nm to 300 nm. Particle diameters herein are those measured by a Zetasizer Nano ZS from Malvern Panalytical Ltd.

In some embodiments, the invention includes an aqueous coating composition comprising: (a) a polymeric binder; (b) optionally, a pigment; (c) water; (d) the compound of Formula 1 as described hereinabove; and (e) at least one coalescent as described hereinabove. In some embodiments, the invention includes an aqueous coating composition comprising: (a) a polymeric binder; (b) optionally, a pigment; (c) water; (d) the compound of Formula 1 as described hereinabove; (e) at least one coalescent as described hereinabove; and one or more nonionic surfactants. Various embodiments of such aqueous coating composition can be employed in uses such as, for example, wall paints, floor coatings, ceiling paints, exterior paints, and window frame coatings.

The aqueous coating composition of the invention can be prepared by techniques which are well known in the coatings art. First, pigment(s), if any, are well dispersed in an aqueous medium under high shear, such as is afforded by a COWLES™ mixer, or predispersed colorant(s), or mixtures thereof are used. Then the aqueous polymeric dispersion is added under low shear stirring along with the compound of Formula 1 as described hereinabove, at least one coalescent, and other coatings additives as desired. The aqueous coating composition may include, in addition to the aqueous polymeric dispersion and optional pigment(s), conventional coatings adjuvants such as, for example, extenders, emulsifiers, plasticizers, curing agents, buffers, neutralizers, rheology modifiers, surfactants, humectants, biocides, antifoaming agents, UV absorbers, fluorescent brighteners, light and/or heat stabilizers, biocides, chelating agents, dispersants, colorants, waxes, and water-repellants.

The pigment can be selected from the wide range of materials known to those skilled in the art of coatings, including, for example, organic and inorganic colored pigments. Examples of suitable pigments and extenders include titanium dioxide such as anatase and rutile titanium dioxides; zinc oxide; antimony oxide; iron oxide; magnesium silicate; calcium carbonate; aluminosilicates; silica; various clays such as kaolin and delaminated clay; and lead oxide. It is also contemplated that the aqueous coating composition may also contain opaque polymer particles, such as, for example, ROPAQUE™ Opaque Polymers (available from The Dow Chemical Company). Also contemplated are encapsulated or partially encapsulated opacifying pigment particles; and polymers or polymer emulsions adsorbing or bonding to the surface of pigments such as titanium dioxide such as, for example, EVOQUE™ polymers (available from The Dow Chemical Company); and hollow pigments, including pigments having one or more voids.

Titanium dioxide is the main pigment used to achieve hiding in architectural paints. This pigment is expensive and in short supply. One way to achieve hiding while decreasing the amount of $TiO_2$ is to include multistage emulsion polymers, commonly known as "opaque polymers," that add opacity to the paint film. These polymers are water-filled emulsion polymer particles with a high $T_g$, such as particles polymerized using styrene as the predominant monomer. These particles fill with air during film formation and scatter light, thereby creating opacity.

The amounts of pigment and extender in the aqueous coating composition vary from a pigment volume concentration (PVC) of 0 to 85 and thereby encompass coatings otherwise described in the art, for example, as clear coatings, stains, flat coatings, satin coatings, semi-gloss coatings, gloss coatings, primers, textured coatings, and the like. The aqueous coating composition herein expressly includes architectural, maintenance, and industrial coatings, caulks, sealants, and adhesives. The pigment volume concentration is calculated by the following formula:

PVC (%)=(volume of pigment(s),+volume extender(s)×100)/(total dry volume of paint).

The solids content of the aqueous coating composition may be from 10% to 70% by volume. The viscosity of the aqueous coating composition may be from 50 centipoises to 50,000 centipoises, as measured using a Brookfield viscometer; viscosities appropriate for different application methods vary considerably, as is known to those skilled in the art.

In use, the aqueous coating composition is typically applied to a substrate such as, for example, wood, metal, plastic, marine and civil engineering substrates, previously painted or primed surfaces, weathered surfaces, and cementitious substrates such as, for example, concrete, stucco, and mortar. The aqueous coating composition may be applied to a substrate using conventional coating application methods such as, for example, brush, roller, caulking applicator, roll coating, gravure roll, curtain coater and spraying methods such as, for example, air-atomized spray, air-assisted spray, airless spray, high volume low pressure spray, and air-assisted airless spray.

Drying of the aqueous coating composition to provide a coating may be allowed to proceed under ambient conditions such as, for example, at 5° C. to 35° C. or the coating may be dried at elevated temperatures such as, for example, from greater than 35° C. to 50° C.

Some embodiments of the invention will now be described in detail in the following Examples.

Examples

The following examples are given to illustrate the invention and should not be construed as limiting its scope. All parts and percentages are by weight unless otherwise indicated.

Synthesis of Compounds of Formula 1

Compounds of Formula 1 for use in embodiments of the present invention are prepared as follows.

560 grams of a pentaerythritol ethoxylate (Polyol 4640 commercially available from The Perstorp Group) is preheated at 40° C. in an oven and then added to a stirred reactor with stirring at 250 rpm. 6 grams of potassium hydroxide (50% aqueous solution, from Sigma-Aldrich) is added to the reactor to serve as a catalyst.

Prior to introduction of alkylene oxide, a system pressure test is conducted. Nitrogen is introduced to the reactor, all valves are closed, and the pressure is monitored for 15 minutes. A pressure fluctuation of less than 70 millibar for 15 minutes is observed and considered acceptable.

Water is removed from the reactor by stirring under vacuum at 50-60° C. The reactor is then heated to 120° C. and stirring continued at 250 rpm.

While keeping the reactor at 120° C. and stirring at 250 rpm, a total of 460 grams of butylene oxide (commercially available from The Dow Chemical Company) is introduced into the reactor in a manner so as to maintain the maximum reactor pressure under 4 bars. After the pressure in the reactor is stable for more than 2 hours to indicate that the reaction has completed, the temperature is reduced to about 60° C., followed by purging with nitrogen three times to remove all unreacted butylene oxide from the reactor to a scrubber system.

The reactor is cooled to 40° C., a 990 grams of reaction products comprising compounds of Formula 1 are collected. The compounds of Formula 1 have the following structure (designated as Formula 2) with the sum of the x values=5 and the sum of the y values=12:

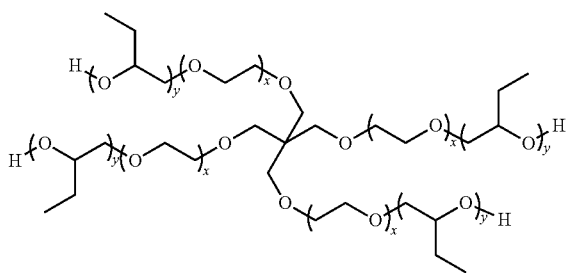

(Formula 2)

The compounds of Formula 2 are embodiments of the compounds of Formula 1 where, in the structure of Formula 1, the sum of the x values is 5, the sum of they values is 12, z is 0, $R_1$ is hydrogen, $R_2$ is an ethyl group, and $R_4$ is hydrogen. For purposes of the following Examples, the compounds of Formula 2 will be referred to as the "Inventive Freeze-Thaw Stabilizer" or "Inventive F-T Stabilizer."

For evaluation, the Inventive F-T Stabilizer is compared to a tristyryl phenol-initiated ethoxylate stabilizer (Rhodoline FT-100 commercially available from Solvay) (referred to herein as "Comparative F-T Stabilizer"). Another popular freeze-thaw stabilizer, propylene glycol, was considered but was not evaluated; it is not a good candidate for low VOC architectural paint formulations due to its low boiling point.

Minimum Film Formation Temperature

The minimum film formation temperature (MFFT) of Inventive F-T Stabilizer is measured and compared to the minimum film formation temperature of Comparative F-T Stabilizer and of a popular coalescent, UCAR™ Filmer IBT (The Dow Chemical Company). The ability of these compounds to reduce the minimum film formation temperature of a styrene-acrylic-based binder (PRIMAL™ DC-420) is evaluated.

The MFFT is measured in accordance with ASTM D2354. A MFFT-Bar.90 is used for the MFFT test with a temperature range from −10 to 90° C. The specified sample is put down onto the bar followed by drawing down the sample using a 75 μm draw down bar. After 2 hours in the instrument, the films are inspected visually (visual MFFT) followed by manually pulling the tape off the bar to observe mechanical failure of the film (mechanical MFFT). The results are shown in Table 1:

TABLE 1

| Binder Amount (g) | UCAR™ Filmer IBT Amount (g) | Inventive F-T Stabilizer Amount (g) | Comparative F-T Stabilizer Amount (g) | MFFT, ° C. |
|---|---|---|---|---|
| 100 | | | | 34.0 |
| 100 | 5 | | | 6.7 |
| 100 | | 5 | | 19.7 |
| 100 | | | 5 | 32.0 |
| 100 | 4 | 5 | | 5.7 |
| 100 | 4 | | 5 | 10.5 |
| 100 | 5 | | 5 | 7.0 |

As shown in Table 1, the Inventive F-T Stabilizer helps reduce the MFFT of the binder from 34.0° C. to 19.7° C. Very remarkably, when the Inventive F-T Stabilizer is used, the amount of coalescent UCAR™ Filmer IBT can be reduced from 5 weight percent to 4 weight percent while achieving an MFFT of less than 6° C. In contrast, the Comparative F-T stabilizer is not able to reduce the amount of coalescent, such that 5 weight percent of the coalescent is still required to achieve an MFFT of ~7° C. Thus, the use of the Inventive F-T Stabilizer to reduce the amount of coalescent can be helpful in minimizing the VOC content of aqueous coating compositions such as architectural paints.

Preparation of Paint Formulations

Three paint formulations (types of aqueous coating compositions) are prepared to evaluate the performance of the Inventive F-T Stabilizer relative to the Comparative F-T Stabilizer. The paint formulations differed in the pigment volume concentration ("PVC"), ranging from 40% to 80%. In addition, two of the formulations are for interior architectural paints and one is for exterior architectural paints. The three formulations are provided in Tables 2-4 below. The freeze-thaw stabilizer (F-T Stabilizer) is the Inventive F-T Stabilizer for the Inventive Coating Compositions, and the Comparative F-T Stabilizer for the Comparative Coating Compositions.

TABLE 2

(Interior Architectural Paint-40% PVC)

| Material | Ratio (g/kg) | Function |
|---|---|---|
| Water | 151.5 | |
| Natrosol 250 HBR (Ashland) | 3.5 | Thickener |
| F-T Stabilizer | 6 | Freeze-Thaw Stabilizer |
| Sodium Hydroxide | 1.5 | pH adjuster |
| OROTAN™ 1288 (The Dow Chemical Company) | 6 | Dispersant |
| TERGITOL™ 15-S-40 (70%) (The Dow Chemical Company) | 2 | Stabilizer (nonionic surfactant) |
| Nopco NXZ (Nopco) | 1 | Defoamer |
| Ti-Pure R-706 (DuPont) | 220 | Colorant |
| Calcined Kaolin DB-80 | 80 | Filler |
| Kaolin | 60 | Filler |
| Calcium carbonate (CC-700) | 80 | Filler |
| Subtotal | 611.5 | |
| Let Down | | |
| PRIMAL™ SF-500 (The Dow Chemical Company) | 330 | Binder (acrylic-based) |
| Nopco NXZ (Nopco) | 2 | Defoamer |
| DALPAD™ 292 (The Dow Chemical Company) | 6 | Coalescent |
| ACRYSOL™ TT-935 (The Dow Chemical Company) | 5 | Thickener |
| ROPAQUE™ Ultra E (The Dow Chemical Company) | 40 | Polymeric Pigment |
| KATHON™ LXE (The Dow Chemical Company) | 1 | Biocide |
| Water | 4.5 | |
| Let Down subtotal | 388.5 | |
| TOTAL | 1000 | |

TABLE 3

(Exterior Architectural Paint-60% PVC)

| Material | Ratio (g/kg) | Function |
|---|---|---|
| Water | 146 | |
| OROTRAN™ 963 (The Dow Chemical Company) | 5 | Dispersant |
| F-T Stabilizer | 15 | Freeze-Thaw Stabilizer |
| AMP-95 (Angus Chemical Company) | 2 | pH Adjuster, Dispersant |
| OROTAN™ CA-2500 (The Dow Chemical Company) | 6 | Dispersant |
| ECOSURF™ EH-9 (The Dow Chemical Company) | 2 | Wetting Agent (nonionic surfactant) |
| BYK-022 (BYK) | 1 | Defoamer |
| NATROSOL™ 250 HBR (Ashland) | 2 | Thickener |
| ROCIMA™ 363 (The Dow Chemical Company) | 2 | Biocide |
| Titanium Dioxide | 120 | Colorant |
| Kaolin, 1250 mesh | 80 | Filler |
| Calcium carbonate (CC-700) | 130 | Filler |
| Talcum powder, 1250 mesh | 40 | Filler |
| Subtotal | 551 | |
| Let Down | | |
| PRIMAL™ DC-420 (The Dow Chemical Company) | 250 | Binder (styrene-acrylic-based binder) |

TABLE 3-continued (Exterior Architectural Paint-60% PVC)

| Material | Ratio (g/kg) | Function |
|---|---|---|
| Nopco NXZ (Nopco) | 2 | Defoamer |
| UCAR ™ IBT (The Dow Chemical Company) | 25 | Coalescent |
| ACRYSOL ™ RM-845 (The Dow Chemical Company) | 1.5 | Thickener |
| ACRYSOL ™ DR-7700 (The Dow Chemical Company) | 3 | Thickener |
| ROPAQUE ™ Ultra E (The Dow Chemical Company) | 60 | Polymeric Pigment |
| KATHON ™ LXE (The Dow Chemical Company) | 2 | Biocide |
| Water | 105.5 | |
| Let Down subtotal | 449 | |
| TOTAL | 1000 | |

TABLE 4

(Interior Architectural Paint-80% PVC)

| Material | Ratio (g/kg) | Function |
|---|---|---|
| Water | 260 | |
| F-T Stabilizer | 10 | Freeze-Thaw Stabilizer |
| AMP-95 (Angus Chemical Company) | 2 | pH Adjuster, Dispersant |
| OROTAN ™ 1288 (The Dow Chemical Company) | 5 | Thickener |
| ECOSURF ™ EH-9 (The Dow Chemical Company) | 1 | Wetting Agent (nonionic surfactant) |
| BYK-022 (BYK) | 2 | Defoamer |
| NATROSOL ™ 250 HBR (Ashland) | 2 | Thickener |
| ROCIMA ™ CF1100 (The Dow Chemical Company) | 2.5 | Biocide |
| Ti-Pure R-706 (DuPont) | 50 | Colorant |
| Kaolin, 1250 mesh | 125 | Filler |
| Calcium carbonate (CC-700) | 275 | Filler |
| Talcum powder, 1250 mesh | 75 | Filler |
| Subtotal | 809.5 | |
| Let Down | | |
| PRIMAL ™ DC-420 (The Dow Chemical Company) | 110 | Binder (styrene-acrylic-based binder) |
| Nopco NXZ (Nopco) | 2 | Defoamer |
| UCAR ™ IBT (The Dow Chemical Company) | 10 | Coalescent |
| ACRYSOL ™ ASE-60 (The Dow Chemical Company) | 2 | Thickener |
| ACRYSOL ™ DR-180 (The Dow Chemical Company) | 3 | Thickener |
| KATHON ™ LXE (The Dow Chemical Company) | 2 | Biocide |
| Water | 61.5 | |
| Let Down subtotal | 190.5 | |
| TOTAL | 1000 | |

Each of the Inventive and Comparative Coating Compositions are prepared as follows. Water is added to a two liter stainless steel canister, followed by the specified thickener and pH adjuster. The mixture is stirred by dispersion plate at ~450 rpm, and mixture thickens gradually. The dispersant, wetting agent, and defoamer are then added (in that order) to the canister, and the mixture is continuously stirred for 10 minutes. Titanium dioxide and fillers (e.g., calcined kaolin, kaolin, calcium carbonate, and/or talcum powder) are then added to the mixture while raising the dispersing speed to 1800 rpm gradually with increasing viscosity. This mixture is kept dispersing for 30 minutes or longer until no particle with size larger than 50 µm is observed in order to insure homogeneity of the mixture. Tables 2-4 represent the amounts shown in a single Coating Composition. Because the mixture that is prepared according to the procedure described in this paragraph is divided into three approximately equal volumes prior to adding the Let Down components, the amounts shown in Tables 2-4 to prepare this mixture need to be tripled in order to prepare the Coating Composition. In other words, the present procedure is used to prepare three samples of the specified Coating Composition.

The mixture is divided into three approximately equal volumes. The dispersion plate is changed to a stirrer, and the mixture is then stirred at 1800 rpm. The specified binder, coalescent, biocide, and thickener (in that order) are then added to each part. The stirring speed is then reduced to 700-800 rpm gradually with decreasing viscosity. The mixture is stirred at 700-800 rpm for ~10 minutes. The specified Freeze-Thaw Stabilizer is then added to each mixture, and the mixture is stirred at 1800 rpm for 10 minutes.

Freeze-Thaw Stability

The freeze-thaw stabilities of the interior architectural paints of Tables 2 and 4 are measured according to GB/T-9268-2008. A paint sample is placed into a freezer at −5° C. (±2° C.) for 18 hours. The paint sample is then removed and left at room temperature for 6 hours. This procedure is repeated for three cycles for each paint sample. The samples are hand sheared with a tongue depressor for 100 stirs and the viscosity (Krebs Unit or KU) is measured after the $3^{rd}$ or $5^{th}$ cycle. The target KU is 95-105 for these Coating Compositions, so if the KU of a Coating Composition is out of this range overnight, the KU is adjusted by adding water or a thickener prior to testing. The results of this test are shown in Tables 5 and 6. Table 5 provides the results for the interior architectural paints at 40% PVC (made from the Coating Compositions according to Table 2), and Table 6 provides the results for the interior architectural paints at 80% PVC (made from the Coating Compositions according to Table 4).

TABLE 5

| Table 2 Coating Compositions (40% PVC) | | Inventive Coating Composition | Comparative Coating Composition |
|---|---|---|---|
| Initial KU | | 106.8 | 106.8 |
| KU after addition of F-T stabilizer | | 107.4 | 113.6 |
| KU overnight | | 110.5 | 118.5 |
| KU after adjustment | | 104.3 | 104.6 |
| F-T at −6° C. | Before | 104.3 | 104.6 |
| | After 1 cycle | 109.8 | 118.2 |
| | After 2 cycles | 117.9 | 114.2 |
| | After 3 cycles | 116.2 | 121.9 |

TABLE 6

| Table 4 Coating Compositions (80% PVC) | Inventive Coating Composition | Comparative Coating Composition |
|---|---|---|
| Initial KU | 83.3 | 83.3 |
| KU after addition of F-T stabilizer | 86.7 | 104.2 |
| KU overnight | 89.2 | 110.4 |
| KU after adjustment | 98.6 | 100.3 |

TABLE 6-continued

| Table 4 Coating Compositions (80% PVC) | | Inventive Coating Composition | Comparative Coating Composition |
|---|---|---|---|
| F-T at −6° C. | Before | 98.6 | 100.3 |
| | After 1 cycle | 128.0 | 124.9 |
| | After 2 cycles | 125.2 | 112.5 |
| | After 3 cycles | 129.2 | 134.0 |

Table 5 shows that the freeze-thaw stability of the Inventive Coating Composition (made with the Inventive F-T Stabilizer) at 40% PVC is better than the Comparative Coating Composition (made with the Comparative F-T Stabilizer) after 3 cycles. Table 6 shows that the freeze-thaw stability of the Inventive Coating Composition (made with the Inventive F-T Stabilizer) at 80% PVC is again better than the Comparative Coating Composition (made with the Comparative F-T Stabilizer) after 3 cycles. Tables 5 and 6 show that the Inventive F-T Stabilizer provides slightly better freeze-thaw stability of an aqueous coating composition than the Comparative F-T Stabilizer at both low and high PVC paint formulations.

Scrub Resistance

Scrub resistance of the coating compositions is also evaluated. Scrub resistance is an overall indicator of densification and anti-pulverization of the paint layers. Scrub resistance is measured using ASTM Test Method D 2486-74A. A drawdown of paint is made with a 150 micron film applicator on a black vinyl scrub chart. The chart is allowed to dry at 23° C. (±2° C.) at 50% relative humidity (±5%) for 7 days. The chart is placed on the scrub machine and scrubbed using a Type SC-2 abrasive scrub medium. The first cut and cut through cycles are recorded.

The scrub resistance of the Inventive F-T Stabilizer is compared to the Comparative F-T Stabilizer. In addition, while not a good candidate for low VOC architectural paint formulations due its low boiling point, propylene glycol is another popular freeze-thaw stabilizer and is also evaluated for scrub resistance. Table 7 provides the results for the interior architectural paints at 40% PVC (made from the Coating Compositions according to Table 2) with the scrub numbers being average values after 2 measurements. Comparative Coating Composition 2 is the Coating Composition according to Table 2 made using propylene glycol as the freeze-thaw stabilizer.

TABLE 7

| | Inventive Coating Composition | Comparative Coating Composition | Comparative Coating Composition 2 |
|---|---|---|---|
| Scrub numbers[a] | 494 | 464 | 481 |
| Performance ratio % | 106.5% | 100% | 103.5% |

Table 7 clearly shows that the Inventive F-T Stabilizer improves scrub resistance compared with both Comparative F-T Stabilizer and propylene glycol.

Heat Storage Stability

The long-term storage stability of paints made with the Inventive F-T Stabilizer is also evaluated. To evaluate heat storage stability, paint is placed into a 50° C. oven for a 10-14 days. The appearance of the paint is checked. In addition, the viscosity is measured.

Table 8 provides the viscosity measurements (in Krebs Unit or KU) for interior architectural paints at 60% PVC (made from the Coating Compositions according to Table 3) with the Inventive Coating Composition made with the Inventive F-T Stabilizer and the Comparative Coating Composition made with the Comparative F-T Stabilizer.

TABLE 8

| | | Inventive Coating Composition | Comparative Coating Composition |
|---|---|---|---|
| Initial KU | | 99.4 | 81.7 |
| KU after adjustment | | 99.4 | 94.0 |
| KU overnight | | 101.2 | 98.1 |
| After storage for 11 days at 50° C. | Before | 102.3 | 97.8 |
| | After | 106.0 | 97.1 |
| | ΔKU | +3.7 | −0.7 |

Table 8 shows that after storage for 11 days at 50° C., both Coating Compositions had ΔKU values of less than 5, which confirms good heat storage stability for both.

In addition, when both Coating Compositions are removed from the oven, the appearance of significant water bleeding (separation of water layer) in the upper part of the paint is clearly observed with the Comparative Coating Composition. Much less water bleeding is observed in the Inventive Coating Composition. This observation may be indicative of the Inventive Coating Composition having good dispersion ability and strong interaction with the fillers and binder particles in the Coating Composition and consequently, improved paint stability.

The above results indicate that the Inventive F-T Stabilizer can advantageously be a competitive, alkyl phenol ethyoxylate(APE)-free, and high-performance freeze-thaw stabilizer in low VOC architectural paints.

We claim:

1. An aqueous coating composition comprising an aqueous polymeric dispersion and a compound according to Formula 1:

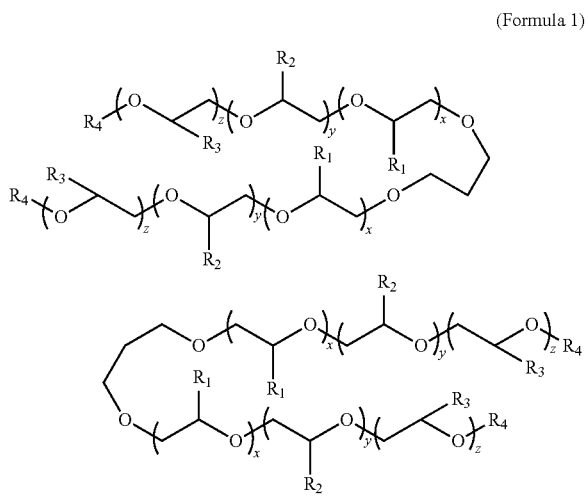

(Formula 1)

wherein $R_1$ is hydrogen, $R_2$ is an alkyl group having 2 to 6 carbon atoms, $R_3$ is hydrogen, and $R_4$ is hydrogen, a linear, branched, or cyclic alkyl group having 1 to 8 carbon atoms,
    wherein the sum of the x values is an average value from 1 to 10, the sum of the y values is an average value ranging from 1 to 10, and z is 0, and x+y+z is from 3 to 20; and wherein the coating composition comprises 0.1 to 10 percent by weight of compounds according to Formula 1 based on the weight of the polymeric dispersion solids.

2. The coating composition of claim 1, wherein the compound has a molecular weight from 500 to 6000.

3. The coating composition of claim 1, further comprising at least one coalescent.

4. The coating composition of claim 1, wherein the aqueous polymeric dispersion comprises an acrylic polymer.

5. The coating composition of claim 1 further comprising one or more binders.

6. A method for improving the freeze/thaw stability of an aqueous coating composition comprising an aqueous polymeric dispersion, the method comprising adding the compound of Formula 1 to the aqueous coating composition:

(Formula 1)

wherein $R_1$ is hydrogen, $R_2$ is an alkyl group having 2 to 6 carbon atoms, $R_3$ is hydrogen, and $R_4$ is hydrogen, a linear, branched, or cyclic alkyl group having 1 to 8 carbon atoms, wherein the sum of the x values is an average value from 1 to 10, the sum of the y values is an average value ranging from 1 to 10, and z is 0, and x+y+z is from 3 to 20.

7. The method according to claim 6, wherein 0.1 to 10 percent by weight of Formula 1 is added, based on the weight of the polymeric dispersion solids.

* * * * *